United States Patent Office 3,326,800
Patented June 20, 1967

3,326,800
ORGANIC MATERIAL STABILIZED WITH STERICALLY HINDERED 4,4'-THIOBIS PHENOLS
Thomas H. Coffield, Farmington, Mich., assignor to Ethyl Corporation, New York, N.Y., a corporation of Virginia
No Drawing. Continuation of application Ser. No. 40,155, July 1, 1960, now Patent No. 3,211,794, dated Oct. 12, 1965. This application Nov. 4, 1964, Ser. No. 408,761
13 Claims. (Cl. 252—48.2)

This application is a continuation of application Ser. No. 40,155, filed July 1, 1960, now U.S. 3,211,794, which in turn is a continuation-in-part of applications Ser. No. 720,825, filed Mar. 12, 1958, now U.S. 3,057,926, Ser. No. 779,068, filed Dec. 9, 1958, now U.S. 3,069,385, and Ser. No. 829,202, filed July 24, 1959, now U.S. 3,114,713.

This invention relates to novel chemical compounds and to compositions of matter containing these compounds as antioxidants.

It has been discovered that a heretofore unkown class of phenolic compounds possesses outstanding antioxidant properties in a wide variety of organic materials which are subject to oxidative decomposition in the presence of air, oxygen or ozone.

It is an object of this invention to provide a novel class of phenolic compounds possessing outstanding antioxidant characteristics. Another object is to provide novel compositions of matter containing a specific type of phenolic compound as an oxidation inhibitor. A further object is to provide a novel class of phenolic sulfur compounds which have outstanding antioxidant properties when used in small amounts in hydrocarbon fuel and lubricant compositions, rubber and certain synthetic hydrocarbon polymers. A still further object is to provide as new compositions of matter, synthetic hydrocarbon polymers which are stabilized by the phenolic sulfur compounds herein disclosed. A specific object of this invention is to provide polyethylene which possesses outstanding oxidative stability.

The objects of this invention are accomplished by a compound having the formula:

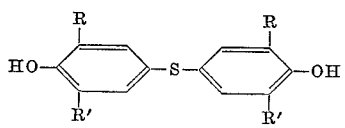

wherein R and R' are alkyl groups branched on the alpha carbon atom and having from 3 to 4 carbon atoms inclusive.

Examples of the compounds of this invention include: 4,4'-thiobis(2,6-di-tert-butylphenol), 4,4'-thiobis(2-sec-butyl-6-isopropylphenol), and 4,4'-thiobis(2,6-di-sec-butylphenol), 4,4'-thiobis(2,6-diisopropylphenol), and the like.

The alkyl radicals represented by R and R' in the above formula include the isopropyl group, the tert-butyl group and the secondary butyl group. It has been discovered that the novel compounds containing these groups are readily prepared and are extremely effective antioxidants in synthetic hydrocarbon polymers as will be described in more detail below. These compounds in which R and R' are a tert-butyl or isopropyl group are preferred as it has been found that they are among the more outstanding antioxiodants for saturated hydrocarbon polymers discovered to date. Of these, 4,4'-thiobis(2,6-di-tert-butylphenol) is the most particularly preferred due to its outstanding antioxidant activity.

The compounds of this invention may be prepared by several processes. One of these consists of reacting the parent phenolic compound (for example, 2,6-diisopropylphenol) with sulfur dichloride. A special method is applicable to the preparation of a particular compound of this invention, namely, 4,4'-thiobis(2,6-di - tert - butylphenol). Whereas this compound is produced by the reaction of sulfur dichloride with 2,6-di-tert-butylphenol, it has also been found to be susceptible to preparation by a process which comprises the reaction of the alkali metal salt of 2,6-di-tert-butylphenol with sulfur dichloride. This method of preparation is not applicable to other compounds of this invention as the phenol starting materials do not have alkali metal salts which are the chemical equivalent of the salt of 2,6-di-tert-butylphenol.

The following examples, in which all parts are by weight, are illustrative of the methods for preparing the compounds of this invention.

Example 1

A solution of 227 parts of distilled SCl$_2$ and about 240 parts of petroleum ether (boiling point 36.5–38° C.) was added slowly with stirring to a solution of 712 parts of 2,6-diisopropylphenol in 400 parts of the petroleum ether. External cooling was applied to maintain the reaction mixture at about 17° C. About ½ the sulfur dichloride solution was added over a 30 minute period during which time the evolution of HCl gas indicated that the reaction was proceeding. After ½ the sulfur dichloride had been added, the solution was refluxed at 38° C. for ½ hour. The remaining sulfur dichloride was then slowly added over a half hour period while the temperature was maintained between 18 and 24° C. The mixture was again refluxed for 30 minutes and then treated with activated charcoal, filtered and additional petroleum ether added. This reaction produced 4,4' - thiobis(2,6 - diisopropylphenol), a valuable antioxidant of this invention.

Example 2

To a reaction vessel was charged 4,000 parts of carbon tetrachloride, 444 parts of carbon disulfide and 515 parts of 2,6-di-tert-butylphenol. The mixture was cooled to −15° C. and 129 parts of sulfur dichloride was slowly added thereto over a 1½ hour period. The mixture was then stirred at room temperature for 1½ hours and then heated to 50° C. for 15 minutes. The volatiles were then removed under reduced pressure producing a mixture of solid and oil which was dissolved in ether and washed with aqueous sodium carbonate, water and then dried over magnesium sulfate. 4,4'-thiobis(2,6-di-tert-butylphenol) is recovered from this reaction mixture.

Example 3

A solution of 34 parts of freshly distilled sulfur dichloride in about 25 parts of petroleum ether was slowly added with stirring to a solution of 123.6 parts of 2-6-di-tert-butylphenol in 60 parts of petroleum ether. One-half of the sulfur dichloride was added slowly at 20 to 25° C. and the mixture was heated to reflux, then cooled to 25° C. and the remaining sulfur dichloride was slowly added. Thereafter the mixture was kept at reflux for 99 hours. The solvent and volatiles were stripped under vacuum. Thereafter the resulting brownish-black oil was subjected to distillation and the residue was fractionally crystallized from methanol. The third fraction of crystals yielded 5 parts of 4,4'-thiobis(2,6-di - tert - butylphenol) having a melting point of 138–140° C. The compound was submitted for sulfur analysis and found to contain 7.5 percent sulfur. The calculated composition of 4,4'-thiobis(2,6-di-tert-butylphenol) is 7.24 percent.

Example 4

A solution of 600 parts of 2-isopropyl-6-tert-butyl-phenol in 360 parts of petroleum ether is agitated while a solution of 260 parts of sulfur dichloride in 10 parts of the petroleum ether is added slowly at about 15°

C. Additional petroleum ether is added during the course of the reaction to dilute the mixture and lessen the heat evolution. This procedure enables the sulfur dichloride to be added at a more rapid rate. During the addition of the sulfur dichloride, the temperature is lowered by external cooling and maintained at 10 to 15° C. The addition of sulfur dichloride is completed in 8 hours after which the mixture is heated to reflux for one hour and then cooled and filtered. The solid precipitate is collected and washed with petroleum ether and dried. A high yield of 4,4'-thiobis(2-isopropyl-6-tert-butylphenol) is realized. It may be purified by recrystallization from n-hexane.

The reaction between the phenolic compound and sulfur dichloride is exothermic and is preferably conducted at from about 5° to about 20° C. This is easily accomplished by external cooling of the reaction mixture while the reactants are under agitation. Higher temperatures lead to undesirable side reactions and consequently greatly reduce the yield of the desired product.

A stoichiometric amount of phenol is employed in preparation of the compounds of this invention. Thus, for each mole of sulfur dichloride employed, two moles of phenol are present in the reaction mixture.

As is illustrated by the above example, it is convenient to conduct the preparation of the compounds of this invention in a suitable solvent. In general, the solvents applicable include low boiling hydrocarbons, halogenated hydrocarbons and inert aromatic compounds such as nitrobenzene. Examples of suitable solvents include carbon tetrachloride, chloroform, n-hexane, 2,4-di-bromopentane, low boiling petroleum ether and the like.

A preferred procedure consists of slowly adding ½ the sulfur dichloride to the phenol and then allowing the reaction to proceed under agitation and proper conditions to maintain the desired temperature; and subsequently slowly adding the balance of the sulfur dichloride which is also contained in a suitable solvent. After the entire amount of sulfur dichloride has been added to the reaction vessel, agitation is allowed to continue at the selected temperature. Slow addition of the sulfur dichloride presents undesirable side reactions.

After initial filtration to remove solids, the compounds of this invention may then be separated from the reaction mixture by precipitation. In some cases the addition of excess fresh solvent causes precipitation of the product. The crude product may then be recrystallized from a suitable solvent such as cyclohexane. Best results are obtained when extremely pure starting materials are employed in conducting the reaction to prepare a compound of this invention. It has been found that whereas the pure products of the reaction are insoluble in the reaction solvent, they become soluble when impurities are present. Thus, when pure starting materials are used, the possibility of the product being soluble in the reaction system is decreased. Often this solubility problem can be overcome by the addition of excess fresh solvent at the end of the reaction period to reduce the impurities to such a low concentration that the product is no longer soluble in the reaction medium.

*Example 5*

A glass reaction vessel was charged with 2061 parts of 2,6-di-tert-butylphenol in about 1800 parts of methanol. To this was added a stoichiometric quantity of sodium methylate in about 2700 parts of methanol. This mixture was allowed to stand for several days at room temperature after which the methanol was removed under reduced pressure and about 4500 parts of tetrahydrofuran were added. The resulting tetrahydrofuran solution of sodium 2,6-di-tert-butylphenolate was treated with 721 parts of sulfur dichloride. The addition of the sulfur dichloride was made at 45–50° C. The reaction mixture was then stirred for 1½ hours and heated at reflux for 15 minutes. After cooling, the mixture was poured into water and extracted with ether. The ether extracts were dried over magnesium sulfate. The resulting ether extract yields 4,4'-thiobis(2,6-di-tert-butylphenol), an antioxidant of this invention.

The compounds of this invention have been found to be outstanding antioxidants. Thus, an embodiment of this invention is a new composition of matter which comprises organic material normally tending to undergo oxidative deterioration in the presence of air, oxygen or ozone, containing a small antioxidant quantity, up to 5 percent, of a compound having the formula:

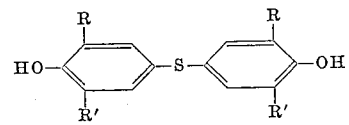

wherein R and R' are alkyl groups branched on the alpha carbon atom having from 3 to 4 carbon atoms inclusive.

The compounds of this invention find important utility as antioxidants in a wide variety of oxygen sensitive materials. Thus, liquid hydrocarbon fuels such as gasoline, kerosene and fuel oil are found to possess greatly increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes; soaps and greases; plastics; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The synthetic lubricants which are enhanced by the practice of this invention are, in general, non-hydrocarbon organic compositions; i.e., organic compositions which contain elements other than carbon and hydrogen. Examples of general classes of material which are protected against oxidative deterioration by the inclusion therein of a compound of this invention include diester lubricants, silicones, halogen containing organic compounds including the fluorocarbons; polyalkylene glycol lubricants, and organic phosphates which are suitable as hydraulic fluids and lubricants. Excellent results are obtained when a compound of this invention is added to any of these classes of materials; however, it has been found that exceptional oxidative stability is imparted to diester lubricants by the practice of this invention. Thus a synthetic diester lubricant containing from about 0.001 to about 2 percent by weight of such a compound constitutes a preferred embodiment of this invention. The synthetic diester oils stabilized by the practice of this invention include sebacates, adipates, etc., which find particular use as aircraft instrument oils, hydraulic and damping fluids and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable lubricating properties and the inhibitor of this invention very effectively stabilizes these materials against oxidative deterioration. Thus, use can be made of oxalates, malonates, succinates, glutarates, adipates, pimelates, suberates, azelates, sebacates, etc. Typical examples of such esters are diisooctyl azelate, di(2-ethylhexyl) sebacate, di-sec-amyl sebacate, diisooctyl adipate, di(2-ethylhexyl) adipate, di(2-ethylhexyl) azelate, di-(1-methyl-4-ethyloctyl) glutarate, di-isoamyl adipate, di(2-ethylhexyl) glutarate, di(2-ethylbutyl) adipate, ditetradecyl sebacate and di(2-ethylhexyl) pinate, diethyl oxalate; di-sec-butyl malonate; di(2-hexyl) succinate; di(isoheptyl) pimelate; di(3-decyl) seberate; di-sec-amyl glutarate; di(2-ethylbutyl) glutarate; di(2-ethylhexyl) glutarate; di-sec-amyl adipate; di(2-methylbutyl) adipate; diethyl adipate; di-2-ethylhexyl adipate; di-sec-amyl azelate, di(isobutyl) azelate; di(2-ethylbutyl) azelate; di(2-ethylhexyl) azelate; di-sec-amyl sebacate; di-sec-butyl sebacate; di(2-ethylhexyl) sebacate; the glutarates; adipates, azelates and sebacates of branched chain secondary alcohols, such as undecanol, tetradecanol, etc., and, in general, diesters of the type described above and in the literature as useful for synthetic lubricant purposes.

Another class of synthetic lubricants which achieve enhanced oxidative stability by the practice of this invention includes the "silicone" lubricants. The term "silicone" as used in this application means a synthetic compound containing silicon and organic groups. In naming specific compounds, the nomenclature system recommended by the American Chemical Society Committee on Nomenclature, Spelling and Pronunciation (Chem. Eng. News, 24, 1233 (1946) will be used. Thus, the compounds which have the —Si—O—Si— linkages are the siloxanes. Derivatives of silane, $SiH_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further included are silicate ester oils, such as tetraalkyloxy and tetraaryloxy silanes of the tetra-2-ethylhexyl and tetra-p-tert-butylphenyl types and the silanes. Also included are the halogen substituted siloxanes, such as the chlorophenylpolysiloxanes.

The polyalkyl, polystryl and polyalkyl polyaryl siloxanes are the preferred types of base medium for the silicon-containing lubricant compositions of the invention because of their high oxidative stability over a wide temperature range. The polyalkyl siloxanes, such as the dimethyl polysiloxane, are slightly preferred over the polyaryl, and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalene, chlorodiphenyl oxides and chlorinated paraffin waxes.

The fluorocarbon lubricants which are enhanced by this invention are linear polymers built up of a recurring unit which is

The fluorocarbon oils and greases are very stable chemically and have high thermal stability. These desirable physical properties appear to be closely related to the bond distances occurring in the fluorcarbon polymeric molecule, which may also contain chlorine bonded to carbon.

Polyalkylene glycol lubricants which are benefited by the practice of this invention are ordinarily the reaction product of an aliphatic alcohol with an alkylene oxide. The preferred alkylene oxides are ethylene oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low pour points and they have the general formula $$R-(-O-C_nH_{2n})_xOH$$

where $n$ is a small integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula

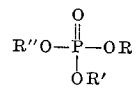

where R, R' and R" represent either hydrogen or an organic radical and where at least one of the groups represented by R, R' and R" is an organic radial. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include: Tris(2-chloro-1-methylethyl) phosphate; tri-n-butyl phosphate; tris-(2-ethyl) phosphate; tri-phenyl phosphate; tris(p-chlorphenyl) phosphate; diethyl m-tolyl phosphate; p-chlorophenyl dimethyl phosphate; tris(2-n-butoxyethyl) phosphate; dimethyl m-tolyl phosphate; di-n-propyl m-tolyl phosphate; di-n-butyl phenyl phosphate; 1,3,-butylene β-chloroisopropyl phosphate; methyl di-m-tolyl phosphate; bis(2-chloro-1-methylethyl) m-tolyl phosphate; dimethyl 3,5-xylyl phosphate; 4-chloro-m-tolyl dimethyl phosphate; 2-ethyl-1-n-propyltrimethylene methyl phosphate; 4-chloro-m-tolyl 1-methyltrimethylene phosphate; dimethyl n-octyl phosphate, and the like.

The synthetic base greases used in formulating lubricant compositions of the invention are formed by admixing a soap with an oil of any of the types described above. Such soaps are derived from animal or vegetable fats or fatty acids, wool grease, resin, or petroleum acids. Typical examples are lead oleate, lithium stearate, aluminum tristearate, calcium glycerides, sodium oleate and the like. In addition, the polyester greases may contain unreacted fat, fatty acids, and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with polyester oils are preferred as they have superior oxidative stability as compared with greases fomulated with other soaps, such as the sodium, calcium or lead soaps.

The compounds of this invention are also useful in protecting petroleum wax—paraffin wax and micro-crystalline wax—against oxidative deterioration. The compounds of this invention also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter, fat, lard, beef tallow and the like.

The novel compounds of this invention have been found to be outstandingly effective antioxidant additives for saturated hydrocarbon synthetic polymers. Thus, an embodiment of this invention is a novel composition of matter comprising a saturated hydrocarbon synthetic polymer derived from polymerization of an aliphatic monoolefin hydrocarbon compound having up to 4 carbon atoms and a small antioxidant quantity, up to 5 percent, of a compound of this invention.

The saturated hydrocarbon synthetic polymer which has greatly enhanced oxidative stability by the practice of this invention, includes polymers obtained from the polymerization of a hydrocarbon monoolefin having up to 4 carbon atoms. Examples of such monomers include ethylene, propylene, butylene and isobutylene. Thus, the polymers are homopolymers and copolymers of ethylene, propylene, butylene and isobutylene.

A preferred embodiment of this invention is polyethylene containing a small antioxidant quantity, up to about 5 percent, of a 4,4'-thiobis(substituted phenol) as defined above. A particularly preferred embodiment of this invention comprises polyethylene containing from about 0.01 to about 2 percent of such a 4,4'-thiobis(substituted phenol). In particular it is found that when from 0.01 to about 2 percent of 4,4'-thiobis(2-isopropyl-6-tert-butyl-phenol) is incorporated with polyethylene, compositions of outstanding oxidative stability result. Another particularly effective compound within the scope of this invention is 4,4'-thiobis(2,6-di-tert-butylphenol).

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Groups IV–B, V–B and VI–B metals of the Periodic System; chromium oxide on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed and the temperature is raised to 130° C. The oxygen pressure is maintained at one atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In tests of this nature, it has been found that the compositions of this invention inhibit the absorption of oxygen by the polyethylene to such an extent that they are among the most outstanding antioxidants tested to date even when compared to very closely related compounds. For example, a sample of the polyethylene with no added antioxidant was tested according to this procedure and was found to take up oxygen rapidly with no initial induction period. After 20 hours of heating, over 45 milliliters of oxygen had been absorbed.

The outstanding results obtainable with the antioxidant compounds of this invention in contrast to those obtained with the uninhibited polyethylene may be demonstrated by a test conducted with a compound of this invention.

There are several methods available for preparing the inhibited hydrocarbon polymer compositions of this invention. Thus the blending of the 4,4'-thiobis(substituted phenol) compounds of this invention, with a polymer such as, for example, polyethylene may be carried out on open rolls, on internal mixers or may be accomplished by mixing with extrusion. It is also possible to prepare concentrated batches of the polymer containing excessive amounts of the 4,4'-thiobis(substituted phenol) compounds of this invention and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The 4,4'-thiobis(substituted phenol) compounds of this invention may be initially mixed with the polymer in the dried state or may be first dissolved in a suitable solvent, then sprayed on the polymer and milled in.

Examples of the hydrocarbon polymer compositions of this invention prepared as described above, follow. All parts and percentages are by weight in these examples.

*Example 6*

To 1,000 parts of polyethylene produced by oxygen catalyzed reaction under a pressure of 20,000 atmospheres and having an average molecular weight of 40,000, is added and mixed 2 parts of 4,4'-thiobis(2-isopropyl-6-tert-butylphenol). The resulting composition has a greatly increased oxidative stability. Excellent results are also obtained when similar quantities of 4,4'-thiobis(2,6-di-tert-butylphenol), or 4,4'-thiobis(2-isopropyl - 6 - sec-butylphenol) are employed.

*Example 7*

To 100 parts of polyisobutylene having an average molecular weight of 100,000 is added 0.5 part of 4,4'-thiobis(2,6-diisopropylphenol). The oxidative stability of the polymer is greatly increased by the addition of this compound. Excellent results are also obtained with similar quantities of 4,4'-thiobis(2-isopropyl-6-tert-butylphenol).

*Example 8*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-thiobis(2-isopropyl-6-tert-butylphenol). Polyethylene of improved oxidative stability results.

Example 9

A linear polyethylene having a high degree of crystallinity (up to 93 percent) and below 1 ethyl branched chain per 100 carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-thiobis(2,6-di-tert-butylphenol), and the resulting product has improved stability characteristics.

Example 10

To a polyethylene having an average molecular weight of 1500, a melting point of 88–90° C. and a specific gravity of 0.92 is added 1 percent of 4,4'-thiobis(2-sec-butyl-6-tert-butylphenol). After milling in the antioxidant an extremely oxidation resistant product results.

Example 11

Two parts of 4,4'-thiobis(2,6-di-tert-butylphenol) are added with milling to 100 parts of a low density polyethylene prepared by high pressure polymerization and which has an average molecular weight of about 20,000. The resulting product is vastly improved in its oxidative stability.

Example 12

To a polyisobutylene polymer having an average molecular weight of 35,000 is added sufficient 4,4'-thiobis(2-isopropyl-6-tert-butylphenol) to give a composition containing 0.03 percent of the antioxidant. The composition has improved antioxidant properties due to the presence of 4,4'-thiobis(2-isopropyl-6-tert-butylphenol).

In addition to the 4,4'-thiobis(substituted phenol) the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Another embodiment of the present invention is rubber containing as an antioxidant therefor, a 4,4'-thiobis(substituted phenol) as defined above. Another part of this invention is the method of preserving rubber which comprises incorporating therein a 4,4'-thiobis(2,6-di-substituted phenol) as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubbery, high molecular weight organic material which is normally susceptible to deterioration in the presence of oxygen, air or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel thiobisphenol stabilizer is relatively, inexpensive and easily prepared and possesses the highly beneficial property of low volatility. As is well known, a highly desirable feature of a rubber antioxidant is that it have a low volatility so that it remains admixed with the rubber during vulcanization and related process steps.

The present invention will be still further apparent from the following specific examples wherein all parts and percentages are by weight.

Example 13

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 4,4'-thiobis(2,6-di-tert-butylphenol). This batch is then cured for 60 minutes at 45 p.s.i. of steam pressure.

Example 14

Two parts of 4,4'-thiobis(2-isopropyl-6-tert-butylphenol) is incorporated in 100 parts of raw butyl rubber prepared by the copolymerization of 90 percent of isobutylene and 10 percent of isoprene.

Example 15

To 200 parts of raw butyl rubber prepared by copolymerization of 95 percent of isobutylene and 5 percent of butadiene is added 1.5 parts of 4,4'-thiobis(2-sec-butyl-6-isopropylphenol).

Example 16

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-thiobis(2,6-diisopropylphenol).

Example 17

To natural rubber (Hevea) is added 0.1 percent of 4,4'-thiobis(2,6-di-sec-butylphenol).

Example 18

Natural rubber stack is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4'-thiobis(2-isopropyl-6-tert-butylphenol) | 1 |
| Benzothiazyl disulfide | 0.4 |
| Amine activator | 0.5 |

This stock is then vulcanized for 60 minutes at 280° F.

Example 19

A butadiene-acrylonitrile copolymer is produced from butadiene-1,3 and 32 percent of acrylonitrile. Two percent (based on the dry weight of the copolymer) of 4,4'-thiobis(2,6-di-tert-butylphenol) is added as an emulsion in sodium oleate solution to the latex obtained from emulsion copolymerization of the monomers. The latex is coagulated with a pure grade of aluminum sulfate and the coaglum, after washing, is dried for 20 hours at 70° C.

Example 20

Three percent of 4,4'-thiobis(2,6-diisopropylphenol) emulsified in sodium oleate is added to a rubber-like copolymer of butadiene-1,3 and styrene containing 25 percent of combined styrene.

Example 21

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 4,4′-thiobis(2-isopropyl-6-sec-butylphenol). The stock so compounded is cured by heating for 45 minutes at 126° C. in a press.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100 |
| Zinc oxide filler | 50 |
| Titanium dioxide | 25 |
| Stearic acid | 2 |
| Ultramarine blue | 0.12 |
| Sulfur | 3 |
| Mercaptobenzothiazole | 1 |
| | 181.12 |

To the above base formula is added one part by weight of 4,4′-thiobis(2-isopropyl-6-tert-butylphenol) and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM designation: D–572–52, described in the ASTM standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM test procedure, D–412–51T (ASTM standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occurs during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 4,4′-thiobis(2-isopropyl-6-tert-butylphenol) gives results which show this additive to be an excellent antioxidant.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional test, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3 piperylene; also the rubber copolymer of conjugated dienes with one or more polymerizable monoolefins compounds which have the capability of forming rubber copolymers with butadiene-1,3, outstanding examples of such monoolefinic compounds being those having the group $CH_2=C$, exemplified by styrene. Examples of such monoolefins are styrene, vinyl naphthalene, alpha methyl styrene, para-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl substituted vinyl pyridines, etc. In fact, excellent stabilization is achieved by incorporating 4,4′-thiobis(2,6-di-tert-butylphenol) in any of the well-known elastomers which are normally susceptible to deterioration in the presence of air, such as elastoprenes, elastolenes, elastothiomers, and elastoplastics.

*Example 22*

To 1,000 parts of gasoline having 44.0 percent paraffins, 17.9 percent olefins and 38.1 percent aromatics, an initial evaporation temperature of 94° F. and a final evaporation temperature of 119° F. is added 10 parts of 4,4′-thiobis(2-isopropyl-6-tert-butylphenol). The mixture is agitated to dissolve the mixture. The resulting fuel has an excellent stability to oxidative deterioration.

*Example 23*

To 1,000 parts of a commercially available diesel fuel having an octane number of 51.7 and a 50 percent evaporation temperature of 509° F. is added 4 parts of 4,4′-thiobis(2,6-di-tert-butylphenol). The resulting fuel is stable to oxidative deterioration.

*Example 24*

To an antiknock fluid composition which is to be used as an additive to gasoline and which contains 61.5 parts of tetraethyllead, 17.9 parts of ethylene dibromide and 18.8 parts of ethylene dichloride is added, with agitation, 1.3 parts of 4,4′-thiobis(2,6-diisopropylphenol). The resulting composition is stable for long periods when exposed to air.

*Example 25*

With 1,000 parts of melted lard is mixed 1 part (0.1 percent) of 4,4′-thiobis(2-sec-butyl-6-tert-butylphenol). After cooling, the lard can be stored for long periods of time without the development of rancidity.

*Example 26*

To 5,000 parts of olive oil is added 1 part of 4,4′-thiobis(2-isopropyl-6-tert-butylphenol) and the mixture is agitated to produce a homogeneous blend which is stable to oxidative deterioration for a long period.

*Example 27*

To an additive-free solvent-refined crankcase lubricating oil having a viscosity index of 95 and a SAE viscosity of 10 is added 0.001 percent of 4,4′-thiobis(2,6-di-tert-butylphenol).

*Example 28*

To 1,000 parts of a solvent refined neutral oil (95 VI and 200 SUS at 100° F.) containing 6 percent of a commercial methacrylate-type VI improver which gives the finished formulation a VI of 140 and a viscosity of 300 SUS at 100° F. is added 5 percent of 4,4'-thiobis(2,6-di-tert-butylphenol).

*Example 29*

To 100,000 parts of dioctyl sebacate having a viscosity of 210° F. of 36.7 SUS, a viscosity of 159 and a molecular weight of 426.7 is added 250 parts (0.25 percent) of 4,4'-thiobis(2-isopropyl-6-tert-butylphenol).

*Example 30*

With 100,000 parts of di-(sec-amyl) sebacate having a viscosity of 210° F. of 33.8 Saybolt Universal seconds (SUS), a viscosity index of 133 and a molecular weight of 342.5 is blended 100 parts (0.1 percent) of 4,4'-thiobis-(2-isopropyl-6-tert-butylphenol). The resulting diester lubricant possesses greatly enhanced resistance against oxidative deterioration.

*Example 31*

To 100,000 parts of di-(2-ethylhexyl) sebacate having a viscosity of 210° F. of 37.3 SUS, a viscosity index of 152 and a molecular weight of 426.7 is added 1,000 parts (1 percent) of 4,4'-thiobis(2,6-ditert-butylphenol). After mixing, the resultant diester lubricant possesses greatly enhanced oxidation resistance.

*Example 32*

To 100,000 parts of di-(2-ethylhexyl) adipate having a viscosity of 210° F. of 34.2 SUS, a viscosity index of 121 and a molecular weight of 370.6 is added 2,000 parts (2 percent) of 4,4'-thiobis(2,6-diisopropylphenol). After mixing, the resultant diester lubricant possesses outstanding resistance against oxidative deterioraiton.

*Example 33*

Five parts of 4,4'-thiobis(2-isopropyl-6-tert-butylphenol) are blended with 2495 parts of diisooctyl azelate having a kinematic viscosity of 3.34 centistokes at −65° F. (ASTM 445–52T), an ASTM slope from −40° F. to 210° F. of 0.693 (ASTM D341–43) and a pour point of −85° F. (ASTM D97–47). Its flash point is 425° F. (ASTM D92–52), and its specific gravity is 0.9123 at 25° C. The resulting lubricant is extremely stable to oxidation.

*Example 34*

One part of 4,4'-thiobis(2,6-di-tert-butylphenol) is blended with 75 parts of diisoooctyl adipate having a viscosity of 35.4 SUS at 210° F., a viscosity of 57.3 SUS at 100° F., a viscosity of 3980 SUS at −40° F. and a viscosity of 22,500 at −65° F. Its viscosity index is 143, its ASTM pour point is below −80° F. and its specific gravity (60° F./60° F.) is 0.926.

*Example 35*

Ten parts of 4,4'-thiobis(2,6-di-tert-butylphenol) are mixed with 10,000 parts of a grease comprising 11 percent of lithium stearate, 1 percent of polybutene (12,000 molecular weight) 1 percent of sorbitan monooleate, 86.6 percent of di[1-(2-methylpropyl)-4-ethyloctyl] sebacate.

*Example 36*

To a siloxane fluid having a viscosity of 71 centistokes at 25° C. and 24 centistokes at 75° C., a specific gravity of 1.03 at 25° C., a freezing point of −70° C. and a flash point of 540° F., which is composed of a halogen substituted polyphenylpolymethyl siloxane is added sufficient 4,4'-thiobis(2-isopropyl-6-tert-butylphenol) to give a composition containing 1.5 percent of the additive. This oil has an extremely high degree of resistance against oxidative deterioration due to the presence of the 4,4'-thiobis(2-isopropyl-6-tert-butylphenol).

*Example 37*

To a poly(trifluorochloroethylene) having the formula $(CF_2CFCl)_x$ and an average molecular weight of 880, pour point of 5° C. and a viscosity of 45 centistokes at 160° F. is added 1.25 percent 4,4'-thiobis(2-isopropyl-6-tert-butylphenol) to prepare an improved lubricant of this invention.

*Example 38*

To a polyalkylene glycol oil lubricant having a viscosity index of 148, ASTM pour point of −55° F., a flash point of 300° F., a specific gravity of 0.979 and a Saybolt viscosity of 135 at 100° F. is added 1 percent of 4,4'-thiobis(2,6-di-tert-butylphenol) to prepare an extremely oxidation resistant polyalkylene glycol lubricant.

*Example 39*

An improved hydraulic fluid and lubricant according to this invention is prepared by adding 2 percent of 4,4'-thiobis(2-isopropyl-6-tertbutylphenol) to tricresyl phosphate.

*Example 40*

4,4'-thiobis(2,6-di-tert-butylphenol) was dissolved in pure white refined mineral oil to the extent that $2.0 \times 10^{-2}$ moles per liter of the phenol was present in the mineral oil. Ferric hexoate was also added to the mineral oil. The concentration of the iron salt was adjusted to 0.05 prcent based on $Fe_2O_3$. One milliliter of the resulting composition was charged to an apparatus for measuring the oxidative stability of the mineral oil. The apparatus consists of a glass vessel having a 12 milliliter capacity and an inlet tube which can be connected to a mercury manometer. The vessel is flushed with oxygen at atmospheric pressure and then connected to the mercury manometer. It is then immersed in a constant temperature bath at 150° C. whereupon the oxygen pressure rise is indicated on the manometer. The manometer is observed until a rapid pressure drop in the vessel occurs. The time from immersion to initiation of the pressure drop is referred to as the induction period of the mineral oil. When mineral oil containing the iron hexoate is subjected to this oxidative test, a pressure drop in the manometer is observed in from 2 to 3 minutes, showing that the mineral oil is unstable to oxidative deterioration at 150° C. However, when the composition containing $2.0 \times 10^{-2}$ per liter of 4,4'-thiobis(2,6-di-tert-butylphenol) is tested in this fashion, no pressure drop is observed in the manometer until after 250 minutes. Thus, the mineral oil has been improved by a factor of 80 against oxidative deterioration by the presence of this small amount of 4,4'-thiobis(2,6-di-tert-butylphenol).

I claim:

1. A composition of matter comprising an organic material normally tending to deteriorate in the presence of air, oxygen or ozone and a small antioxidant quantity, up to 5 percent, of the compound having the formula:

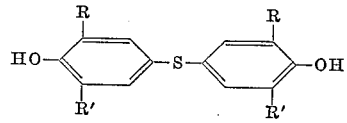

wherein R and R' are alkyl groups branched on the alpha carbon atom having from 3 to 4 carbon atoms inclusive.

2. A composition of matter comprising a saturated hydrocarbon synthetic polymer derived from polymerization of an aliphatic monoolefin hydrocarbon compound having up to 4 carbon atoms and a small antioxidant quantity, up to about 5 percent, of the compound of claim 1.

3. A new composition of matter comprising polyethylene and a small antioxidant quantity, up to about 5 percent, of the compound of claim 1.

4. As a new composition of matter, polyethylene containing from 0.01 to about 2 percent of 4,4′-thiobis(2,6-di-tert-butylphenol).

5. Rubber containing as an antioxidant therefor, an antioxidant quantity, up to 5 percent, of the compound of claim 1.

6. Sulfur-vulcanizable rubber containing as an antioxidant therefor an antioxidant quantity, up to 5 percent, of the compound of claim 1.

7. Natural rubber containing as an antioxidant therefor an antioxidant quantity, up to 5 percent, of the compound of claim 1.

8. A synthetic lubricant normally tending to undergo oxidative deterioration, containing a small antioxidant quantity of the compound of claim 1.

9. The composition of claim 8 where said synthetic lubricant is a diester lubricant.

10. The composition of claim 9 wherein said diester lubricant is a dialkyl sebacate in which each alkyl group contains from 1 to about 10 carbon atoms.

11. A petroleum derived lubricating oil containing an antioxidant quantity of a compound of claim 1.

12. The composition of claim 11 wherein said compound of claim 1 is 4,4′-thiobis(2,6-di-tert-butylphenol).

13. The composition of claim 1 wherein said compound is 4,4′-thiobis(2,6-di-tert-butylphenol).

References Cited

UNITED STATES PATENTS

| | | | |
|---|---|---|---|
| 2,700,691 | 1/1955 | Mayer | 260—45.95 |
| 2,731,443 | 1/1956 | Forman | 260—45.95 |
| 2,841,619 | 7/1958 | Albert | 260—609 |
| 3,069,384 | 12/1962 | Coffield | 252—48.2 |
| 3,114,713 | 12/1963 | Coffield | 252—48.2 |
| 3,145,176 | 8/1964 | Knapp et al. | 252—48.2 |
| 3,148,168 | 9/1964 | Harding | 260—45.95 |

FOREIGN PATENTS

| | | |
|---|---|---|
| 201,160 | 1/1956 | Australia. |
| 463,763 | 4/1937 | Great Britain. |

DANIEL E. WYMAN, *Primary Examiner.*

L. G. XIARHOS, *Assistant Examiner.*